United States Patent [19]

Markandey et al.

[11] Patent Number: 5,265,172
[45] Date of Patent: Nov. 23, 1993

[54] METHOD AND APPARATUS FOR PRODUCING OPTICAL FLOW USING MULTI-SPECTRAL IMAGES

[75] Inventors: Vishal Markandey; Bruce E. Flinchbaugh, both of Dallas, Tex.

[73] Assignee: Texas Instruments Incorporated, Dallas, Tex.

[21] Appl. No.: 845,758

[22] Filed: Mar. 3, 1992

Related U.S. Application Data

[63] Continuation of Ser. No. 421,223, Oct. 13, 1989, abandoned.

[51] Int. Cl.$^5$ ............................................. G06K 9/46
[52] U.S. Cl. .................................... 382/17; 382/1; 382/44; 382/54; 358/103; 358/105
[58] Field of Search ............... 324/306, 309; 358/103, 358/105, 107, 133; 382/1, 6, 17, 41, 42, 43, 44; 356/39, 311; 250/461.2, 208.1

[56] References Cited

U.S. PATENT DOCUMENTS

| | | | |
|---|---|---|---|
| 4,049,353 | 9/1977 | Missio | 356/326 |
| 4,149,081 | 4/1979 | Seppi | 382/54 |
| 4,599,307 | 7/1986 | Saunders et al. | 250/461.2 |
| 4,625,169 | 11/1986 | Wedeen et al. | 324/309 |
| 4,630,114 | 12/1986 | Bergmann et al. | 358/105 |
| 4,710,635 | 12/1987 | Chupp | 250/461.2 |
| 4,716,367 | 12/1987 | Patz | 324/309 |
| 4,739,401 | 4/1988 | Sacks et al. | 358/105 |
| 4,752,734 | 6/1988 | Wedeen | 324/306 |
| 4,839,824 | 6/1989 | Ando | 358/107 |
| 4,924,310 | 5/1990 | von Brandt | 358/113 |
| 4,947,120 | 8/1990 | Frank | 324/309 |
| 5,014,131 | 5/1991 | Reed et al. | 250/208.1 |
| 5,048,103 | 9/1991 | Leclerc et al. | 382/44 |
| 5,128,874 | 7/1992 | Bhann et al. | 358/103 |

OTHER PUBLICATIONS

Little et al., "Analysis of Differential and Matching Method for Optical Flow", *IEEE Workshop on Visual Motion*, Mar. 1989, pp. 173-180.

Schunck, Brian, "Image Flow: Fundamentals & Algorithms", *Image Flow*, Chapter 2, of *Motion Understanding* 1988, pp. 23-80.

Koch et al., "Computing optical flow in resistive networks and in the primate visual system", *IEEE Workshop on Visual Motion*, Mar. 1989, pp. 62-72.

Tretiak et al., "Velocity Estimation from Image Sequences with 2nd Order Differential Equations", IEEE 1984, pp. 16-19.

Netravalli et al., "Motion-Compensated Television Coding: Part I", *AT&T System Tech Journal*, vol. 58, No. 3, Mar. 1979, pp. 631-669.

Limb et al., "Estimating the Velocity of Moving Images in Television Signals", *Computer Graphics & Image Processing*, 1975 pp. (311-327).

Horn et al., "Determining Optical Flow", *Artificia Intelligence Journal*, vol. 17, Aug. 1981, pp. 185-203 *Computer Vision*.

Kearney, Joseph K., "The Estimation of Optical Flow", *Thesis Univ. Minnesota*, Aug. 1983, pp. 1-125.

*Primary Examiner*—Jose L. Couso
*Attorney, Agent, or Firm*—W. Daniel Swayze, Jr.; Richard L. Donaldson; Leo N. Heiting

[57] ABSTRACT

A method and apparatus for producing optical flow obtains a first image of a first spectral region of a field of view, obtains a second image of a second spectral region of the field of view, and processes the images to obtain the optical flow of the field of view. The first and second spectral regions are non-identical, as, for example, the visible and infrared bandwidths.

22 Claims, 6 Drawing Sheets

METHOD AND APPARATUS FOR PRODUCING OPTICAL FLOW USING MULTI-SPECTRAL IMAGES

This application is a continuation of application Ser. No. 07/421,223, filed Oct. 13, 1989 now abandoned.

©Copyright 1990 Texas Instruments Incorporated. A portion of the disclosure of this patent document contains material which is subject to copyright protection. The copyright owner has no objection to the facsimile reproduction by anyone of the patent disclosure, as it appears in the Patent and Trademark office patent file or records, but otherwise reserves all copyright rights whatsoever.

This invention relates generally to image processing methods and apparatus and specifically to an improved method and apparatus for determining optical flow.

BACKGROUND OF THE INVENTION

In the field of image processing various methods have been devised to detect motion of objects and/or identifying those objects based upon an analysis of the detected motion. The methods analyze images of the field of view under consideration taken at different points in time. The term image is used herein in the broadest sense as a two-dimensional intensity field. An image may be a set of data representative of the intensity at pixels in the image.

Motion detection is important in the area of object recognition, for example, for security systems such as parking lot monitoring. Monitoring problems can involve both motion detection and object recognition. Notion detection of objects in a field of view relates to distinguishing moving objects, such as vehicles, from surrounding objects. For example, an automobile may be moving through a crowded parking lot making visual detection from a single image very difficult. In order to detect the presence of the moving automobile, several images of the area, or field of view, could be taken from a sensor mounted on a pole, on a helicopter, or such. After analyzing several images taken of the same area at successive points in time, motion can often be detected.

Object recognition relates to not only detecting the motion of a potential object of interest, but also attempting to discriminate between the moving object, as for example a car, versus some other type of vehicle which or person who also may be in the area. The nature of the motion detected may be indicative of the type of object moving in the area of concern. Typically, images need to be taken at a relatively closer range in order to recognize an object than they do to merely detect a moving object.

Motion detection in which the relative motion between a sensor and the objects in a field of view is determined also can be used to determine the three-dimensional structure of an environment through various published techniques. Passive navigation, and obstacle avoidance, can also utilize motion detection techniques. Relative motion detection also can be useful in adaptive cruise control, for example. The analysis of the relative motion between a moving vehicle, such as an automobile, and its surroundings can be used to alter and/or correct the speed and direction of the vehicle.

One common method of attempting to detect motion involves "subtracting" images of a particular area of view taken at different points in time. The data representation of one image is subtracted from the data representation of the other image to detect whether or not any motion has taken place during the time between the two images. Pixels of the combined images where no motion has taken place during the time interval will tend to have zero values. At areas in the field of view where motion has taken place, and the image intensity has therefore changed between the images, non-zero values will result, indicative of the change. A graphic plot of the non-zero data points at the pixel level after the subtraction has taken place will illustrate the areas in the field of view where motion has been detected.

One major problem associated with using the "subtraction" approach to motion detection is that the method is sensitive to sensor motion. For example, in outdoor applications during the time elapsing between two images practically all surfaces in the field of view will have moved relative to the sensor, thereby producing a change in intensity when the two images are "subtracted". The result is that motion can be detected, but it is extremely difficult to discern whether the detected motion is attributable to moving objects or to the moving sensor. As a result, the "subtraction" approach is very limited. Another limitation is due to the effect of electrical noise on the data output of the sensor which tends to distort the images.

In addition to simplify determining the presence or absence of motion, it is possible to quantify the motion as a part of motion detection as well as to provide a basis for object recognition. One description of motion that can be quantified is known as "optical flow". As used in this description and in the appended claims, the words "optical flow" is defined as the two-dimensional velocity field in the image plane induced by the relative motion of a sensor and/or the object(s) in the field of view. The underlying theory of the optical flow at the pixel level is briefly described below.

Lot E (x, y, t) be the intensity at a pixel, whose coordinates are (x, y) in the image at time t.

One of the earliest assumptions, now known as the brightness constancy assumption, about the spatial and temporal variations of the image brightness in a field of view states that:

$$\frac{dE}{dt} = 0 \tag{1}$$

This equation (1) can be expanded to give:

$$E_x u + E_y v + E_t = 0, \tag{2}$$

where $E_x$, $E_y$ and $E_t$ are the partial derivatives of E with respect to x,y, and t respectively and (u,v) are the optical flow components of pixel (x,y) at time t. The foregoing equation is an underconstrained equation in the unknowns (u, v) which cannot be solved without imposing additional constraints.

Certain early researchers provided mathematical techniques for solving equation (2) although the term optical flow was not used. A. N. Notravali, J. D. Robbins: "Motion-Compensated Television coding: Part I", The Bell System Technical Journal, Vol. 58, No. 3 March 1979; and J. O. Limb, J. A. Murphy: "Estimating the Velocity of Moving Images from Television Signals", Computer Graphics and Images Processing, 4 1975.

Horn and Schunck (B. K. P. Horn, B. G. Schunck, "Determining Optical Flow", Computer Vision, J. H.

Brady, ed., North-Holland Publishing, 1981.) proposed an iterative technique for computing optical flow. They propose a solution to the brightness constancy equation (2) by imposing a smoothness constraint on the optical flow field and minimizing an error functional in terms of accuracy and smoothness. This technique is considered the standard for pixel level optical flow computation. One problem with this technique is that it smooths across motion boundaries of objects as it is a global optimization process. This tends to smear out any motion discontinuities along occluding objects or along the figure-ground boundaries in the field of view.

Other techniques have attempted to solve the brightness constancy equation (2) by proposing various constraints. Kearney (J. K. Kearney, "The Estimation of Optical Flow", Ph.D. Dissertation, Department of Computer science, University of Minnesota, 1983.) proposed a least squares approach where it is assumed that the optical flow is constant within a surrounding neighborhood of a given pixel. A constraint is obtained from each pixel of this neighborhood leading to an overconstrained system of linear equations in terms of the optical flow components. These equations are then solved by means of a least squares approach. Typically this technique produces flow fields that look "blocky" and is generally less accurate than other techniques (J. J. Little, A. Verri, "Analysis of Differential and Matching Methods for Optical Flow", Proc. Workshop on Visual Motion, 1989.).

Schunck has suggested another approach to optical flow determination (B. G. Schunck, "Image Flow: Fundamentals and Algorithms", Motion Understanding-Robot and Human Vision, W. N. Martin and J. K. Aggarwal, ed., Kluwer Academic Publishers, 1988.). This approach transforms the brightness constancy equation (2) into a polar form and is convenient for representing image flows with discontinuities as the polar equation will not have delta-functions at discontinuities. Every constraint equation defines a line in the two-dimensional velocity space of optical flow components. If pixels in a region have similar velocity vectors, their corresponding lines will intersect in a tight cluster. The technique basically searches for the tightest cluster and assigns the central velocity of that cluster to the pixel. This technique is known as the "constraint line clustering" technique. The output has to be smoothed to improve the overall coherence of the velocity field. Schunck suggests use of an edge detection step on the velocity field components before smoothing, so that smoothing can be carried out only within closed regions and not cross motion boundaries.

Koch and others have addressed the problem of smoothing across discontinuities by using the concept of binary line processes which explicitly code for the presence of discontinuities (Christof Koch, "Computing Optical Flow in Resistive Networks and in the Primate Visual System", Proc. Workshop on Visual Notion, IEEE, 1969). Binary horizontal and vertical line processes are used. If the spatial gradient of optical flow between two neighboring pixels is greater than a predetermined threshold, the optical flow field is considered "broken" and the appropriate motion discontinuity at that location is switched on. If little spatial variation exists, the discontinuity is switched off. The line process terms are encoded as a modification of the Horn and Schunck minimization terms for smoothness. An additional "line potential" term encourages or discourages specific configurations of line processes.

While the foregoing brightness constancy optical flow equation (2) has been used as a basis of many optical flow techniques, it should be noted that the imposition of the various constraints discussed above results in optical flow values which are heuristic approximations rather than analytically exact solutions of the brightness constancy equation. Additionally, it is not a realistic assumption in many cases to assume that the brightness corresponding to a physical point in the three-dimensional world remains unchanged with time. This will not be true, for example, when points on an object are obscured or revealed in successive image frames, or when an object moves such that the incident light hits a given point on the object from a different angle between image frames. This will cause the shading to vary.

Tretiak and Pastor (O. Tretiak, L. Pastor, "Velocity Estimation from Image Sequences with Second Order Differential Operators", Proc. Int. Conf. on Patt. Rec., 1982) suggested that a constrained set of equations can be obtained by employing second order differentials to obtain the following:

$$E_{xx}u + E_{xy}v + E_{xt} = ) \tag{3}$$

$$E_{xy}u + E_{yy}v + E_{yt} = 0 \tag{4}$$

where $E_{xx}$, $E_{xy}$ and $E_{yy}$ are the second order partial derivatives of E with respect to xx, xy and yy respectively, and Ext and Eyt are the second order partial derivative of E with respect to xt and yt respectively. These equations (3, 4) provide a constrained set of equations which can be solved for optical flow vectors (u, V). Together with the brightness constancy equation (2) the foregoing equations (3, 4) provide an overconstrained set of equations which can be solved for optical flow vectors (u, v) using least square methods. Equations (3,4) are referred to as the gradient constancy optical flow equations assuming a spatial gradient constancy in the image sequence as opposed to equation (2) which assumes brightness constancy in the image sequence. An optical flow technique based upon gradient constancy would not be influenced by intensity changes which do not change the spatial gradient. The accuracy of gradient constancy based techniques, however, also can be affected by shading changes mentioned previously.

SUMMARY OF THE INVENTION

It is an object of the present invention to provide a method and apparatus for determining optical flow using the brightness constancy assumption which results in a solution of the brightness constancy equation.

It is another object of the present invention to provide a method and apparatus for determining optical flow of an image which may then be displayed or processed further in accordance with the needs of a particular application.

It is another object of the present invention to provide a method and apparatus for determining optical flow using images from at least two spectral regions.

The method of the present invention comprises the stops of obtaining images in a field of view from at least two spectral regions. Each image is the output of a sensor receptive to a different bandwidth in the spectrum. The images are processed to determine the optical flow for the field of view.

The images from sensor outputs can be obtained using a variety of known sensors, including, but not limited to, video cameras, infrared sensors, red, green and blue (RGB) video sensors, and imaging range sensors. Sensor outputs are pre-processed, if necessary, to smooth and/or register the data, and then processed utilizing electronic data processing, optical processing, biological processing, VLSI, other devices, or computer software to determine the optical flow. The optical flow output can be visually displayed or serve as input for further processing depending upon the specific application in question.

Other objects and advantages may become apparent to those skilled in the art upon a reading of this disclosure in conjunction with the attached drawings in which:

DETAILED DESCRIPTION OF THE INVENTION

Figure 1:
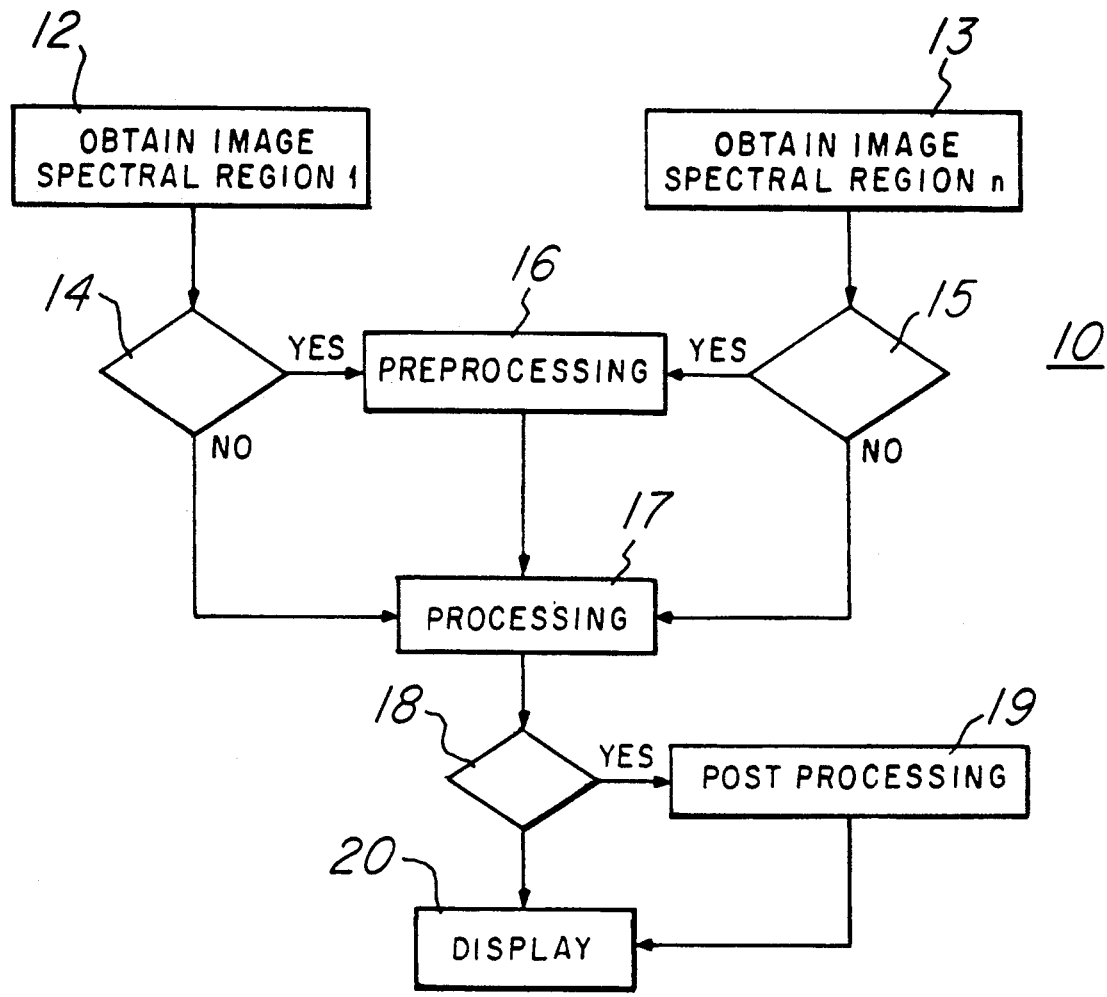
FIG. 1 is a flow chart diagram showing a method of image processing according to the present invention.

Referring now to FIG. 1, which is a flow chart showing the steps in the method 10 of the present invention. Images are obtained for a first spectral region 12 and for a second spectral region 13. The images can be obtained from a variety of sensors such as video cameras, infrared cameras and other sensors. The images may comprise electronic or optical output signals representative of intensities at the pixel level within the image. The term pixel is used herein in a broad sense as including both a picture cell and an array element as the context may require. The present description relates to an image produced by a sensor having a digitized output, however, it is to be understood that the principles of the present invention can be applied using sensors having an analog or optical output as well.

The sensors for spectral region 12 and spectral region 13 are responsive to different bandwidths in the spectrum. Many combinations are possible, of course, which meet the criteria that the bandwidth of each spectral region used be non-identical in accordance with the present invention. The discussion herein relates to the use of 2 non-identical spectral regions of a field of view. It is to be understood, however, that the method and apparatus of the present invention can be utilized with many spectral regions without departing from the spirit and scope of the present invention.

In the case of two sensors, such as a video camera and an infrared camera, images will be produced for which the brightness constancy equations will be:

$$E_{xTV}u + E_{yTV}v + E_{tTV} = 0 \tag{5}$$

$$E_{xIR}u + E_{yIR}v + E_{tIR} = 0 \tag{6}$$

These two linear equations can be solved in many useful applications for the two unknowns (u, v) using known techniques without imposing additional assumed constraints as is required with other previously discussed methods assuming brightness constancy. It should be noted that in some situations it may be preferred that the images of the two spectral regions such as the TV and IR images above, be spatially registered to provide more definitive results. In situations in which the optical flow varies smoothly over the image precise registration of the images may not be necessary. In still other applications it may be advantageous to use images which are slightly unregistered, as, for example, to help alleviate problems associated with situations in which a degenerative condition may otherwise prevent use of the present invention.

Similarly, a set of gradient constancy equations can be obtained if two sensors are used. If a video camera and an infrared camera are used, the gradient constancy equations will be:

$$E_{xxTV}u + E_{xyTV}v + E_{xtTV} = 0 \tag{7}$$

$$E_{xyTV}u + E_{yyTV}v + E_{ytTV} = 0 \tag{8}$$

$$E_{xxIR}u + E_{xyIR}v + E_{xtIR} = 0 \tag{9}$$

$$E_{xyIR}u + E_{yyIR}v + E_{ytIR} = 0 \tag{10}$$

Equations (7-10) can be solved using a least squares technique or any two of the four linear differential equations can be solved. Alternatively, one of equations (5-6) and one of the equations (7-10) can be solved simultaneously for optical flow vectors (u, v). It should also be apparent that three or more of the equations (5-10) can be solved using a least squares approach if desired. The present invention thus can be utilized to obtain an overconstrained set of equations taking into account both brightness constancy and gradient constancy.

If more than two images are used, several linear equations can be derived resulting in an overconstrained set of equations. For example, in the case of an RGB sensor producing images in the red, green and blue bandwidths of the spectrum, the three brightness constancy equations in two unknowns will be:

$$E_{xR}u + E_{yR}v + E_{tR} = 0 \tag{11}$$

$$E_{xG}u + E_{yG}v + E_{tG} = 0 \tag{12}$$

$$E_{xB}u + E_{yB}v + E_{tB} = 0 \tag{13}$$

This overconstrained system of equations (11-13) can be solved for the unknowns (u, v) using standard least squares methods to provide an analytically exact solution for the unknowns (u, v) without imposing any additional constraints. Alternatively, any two of the linear brightness constancy equations (11-13) can be solved for the unknowns (u, v) using known techniques.

In a manner similar to that discussed previously with respect to use of two sensors, an RGB sensor can be used to obtain an over constrained set of six gradient constancy equations. Any two or more of which may be solved for optical flow vectors (u, v).

The images obtained undergo a processing step 17 to be discussed hereinafter. The output of the processing step can then be displayed 20 to provide a visual illustration of the optical flow of the field of view. The output can also be processed further depending upon the specific application. For example, in the area of adaptive cruise control the optical flow output can be utilized as an input to the control system of the device for further processing and ultimate corrective action. In the area of High Density Television (HDTV) image compression generally follows the processing of optical flow as applied to HDTV transmissions where the transmission bandwidth is too small to carry the uncompressed signal. In practice, intermediate preprocessing 16 and post-processing 19 steps are useful to refine the images before it is processed 17, displayed 20 or otherwise utilized as shown in FIG. 1. The method of the present invention can provide for a determination of whether or not images from the first spectral region 12 needs to be preprocessed 14 prior to processing 17. Similarly, the same determination 15 can be made with respect to the image data of the second spectral region 13 prior to processing 17. Preprocessing 16 can, and in many cases, should, include some smoothing function, such as a Gaussian function Such data smoothing functions are well known and therefore will not be discussed in further detail.

Whether or not preprocessing 16 is required or desired, processing 17 can be accomplished through a variety of methods. Four such methods are shown in FIGS. 2-6 and Appendix I, and discussed below.

Figure 2:
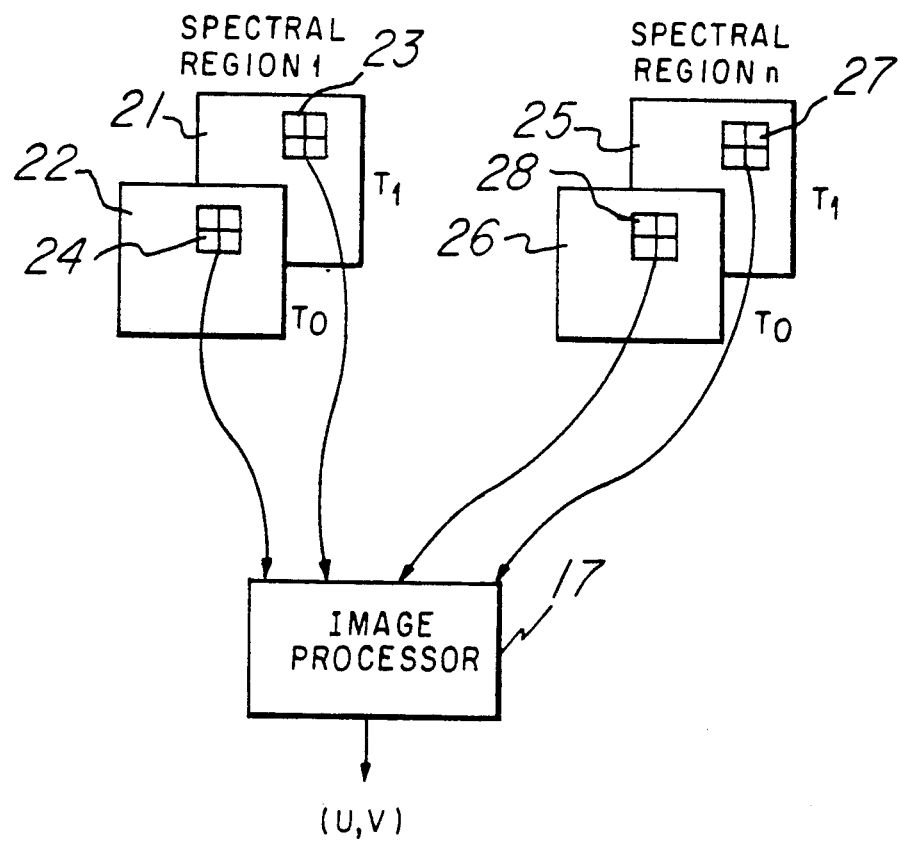
FIG. 2 is a schematic diagram of a unit processing method utilizing the principles of the present invention.

FIG. 2 is a diagram of an image processing system which processes images according to the present invention. An image 22 of spectral region 1 taken at time $t_o$ is shown having a $2 \times 2$ pixel array 24. Image 21 of the same spectral region 1 taken at time $t_1$ having a $2 \times 2$ pixel array 23 is also shown. Together images 22 and 21 define an image data set for spectral region 1. The digital output of the pixel arrays 23, 24 is provided as an input to image processor 17. Similarly, image 26 of spectral region n taken at time to has a $2 \times 2$ pixel array 28 as an input to the image processor 17. Likewise, image 25 of spectral region n taken at time t, has a $2 \times 2$ pixel array 27 as an input to image processor 17. The sensor being used will determine the number of images which comprise the image data set for a spectral region. Image processor 17 can comprise a variety of configurations to process the data from the pixel arrays to provide an output of optical flow vectors (u, v) as shown in FIG. 2.

Figure 3:
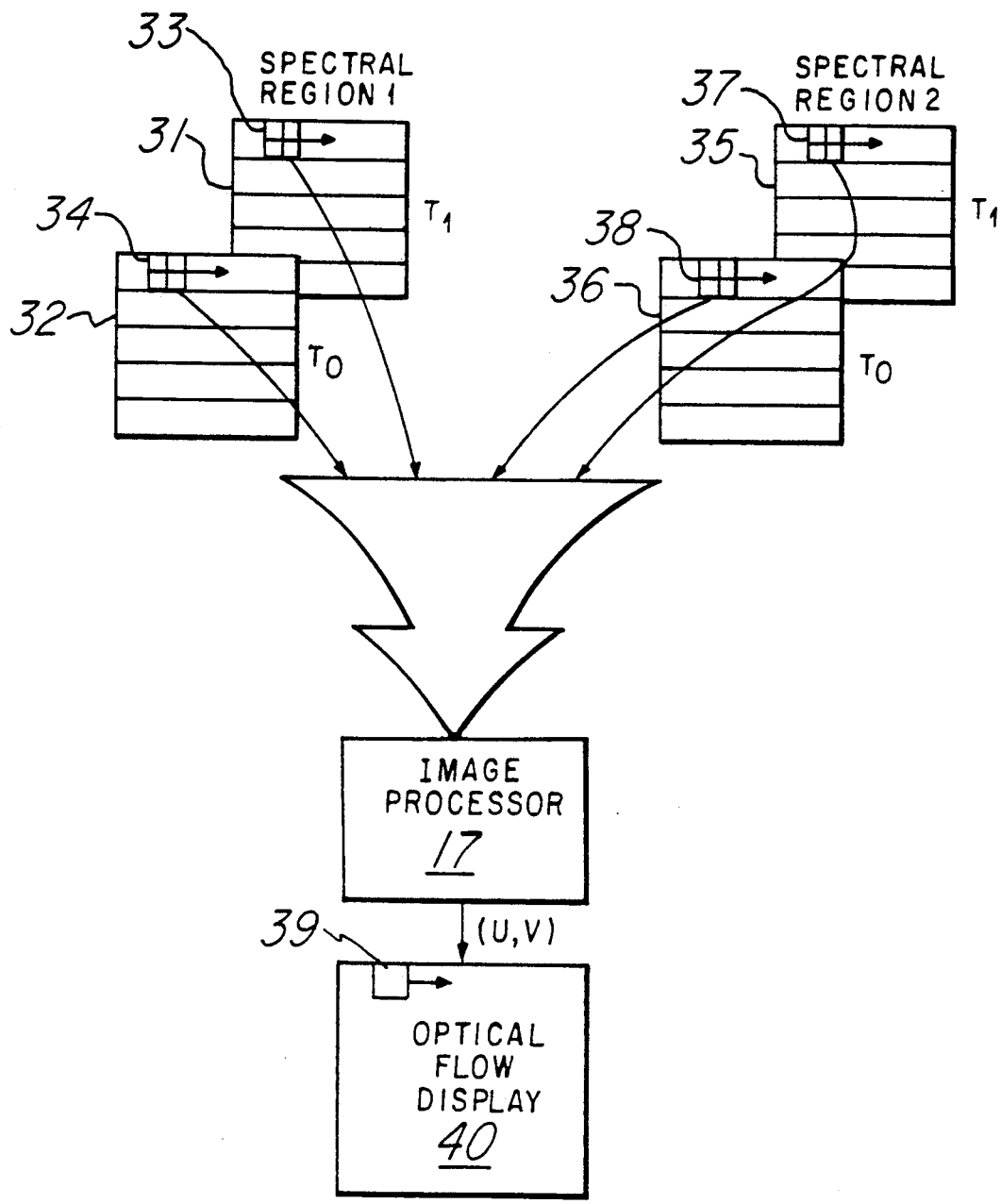
FIG. 3 is a schematic diagram showing the processing method of FIG. 2 according to the present invention using a scanning architecture.

FIG. 3 shows an alternative architecture processing embodiment that may be used employing the present invention. In FIG. 3, images 31 and 32 taken at time t, and time to respectively have $2 \times 2$ pixel arrays 33 and 34 as outputs from a sensor (not shown) which sweeps the field of view in a horizontal motion progressing from row to row such as a video TV camera. Sensor outputs are similarly obtained from spectral region n. Image 36 taken at time to and image 35 taken at time $t_1$ therefore have $2 \times 2$ pixel arrays 38 and 37 respectively as sensor outputs connected to the image processor 17 for providing optical flow vectors u and v. The optical flow coordinates are shown as inputs to display unit, output memory or output channel 40 which also provides a horizontal sweeping motion from row to row to produce a visual display of optical flow vectors at each pixel 39 within the unit 40 corresponding to the processed pixel outputs of the sensors 33, 34, 37, and 38 as shown in FIG. 3. As previously stated, the optical flow can also be utilized in further processing with or without any visual display.

Figure 4:
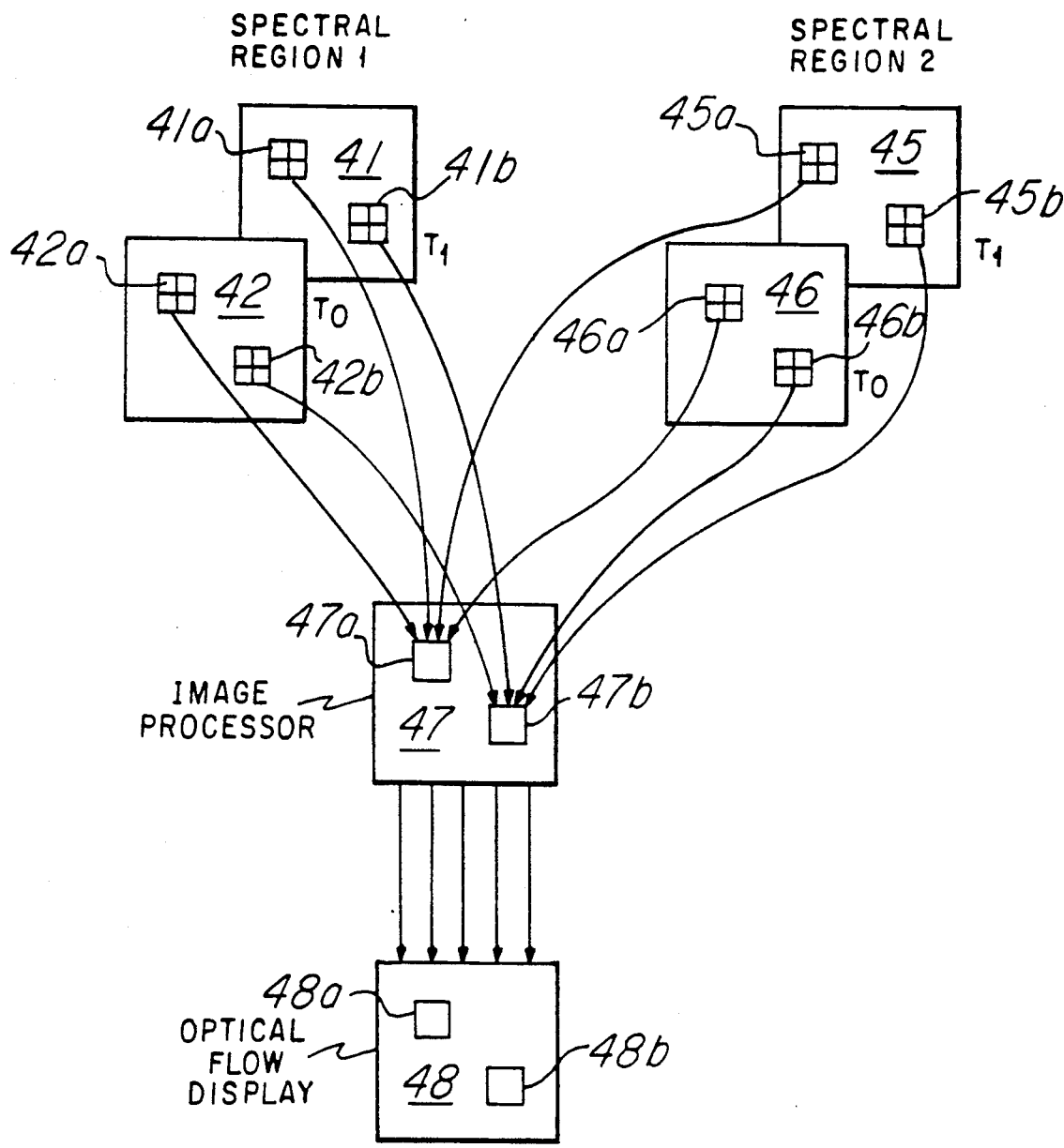
FIG. 4 is a schematic diagram showing an alternative processing method according to the present invention using a parallel processing architecture.

FIG. 4 shows yet another embodiment of an image processor utilizing the present invention in a parallel architecture. In FIG. 4 an image processor 47 has a digital signal processor chip associated with each set of $2 \times 2$ pixel arrays of the images. For clarity, only processor 47a and processor 47b are shown. It should be understood that image processor 47 contains as many processors as are necessary to process the inputs from each pixel array of an image at each spectral region, thereby allowing the data from each pixel array of the images 41, 42, 45 and 46 to be processed in parallel. As shown, image 42 of spectral region 1 taken at time to has a plurality of pixel arrays in the image 42. Again, for simplicity and clarification, only 2 pixel arrays are shown in each image 41, 42, 45 and 46, it being understood that many more pixel arrays are present in each image. Accordingly, pixel array 42a has an input to array processor 47a of image processor 47. Similarly, pixel array 41a of image 41, pixel array 45a of image 45 and pixel array 46a of image 46 are provided as inputs to array processor 47a of the image processor 47.

Likewise, the inputs to pixel array processor 47b of image processor 47 has as its inputs the data from pixel array 41b of image 41, pixel array 42b of image 42, pixel array 45b of image 45 and pixel array 46b of image 46. The arrangement in FIG. 4 is useful in applications requiring high-speed processing between obtaining the images 41–42, 45–46 and the display or other processing of the optical flow. The high-speed parallel processing capabilities of image processor 47 provide simultaneous parallel processing of images at each pixel array thereby shown in FIG. 3 or the unit processing architecture shown in FIG. 2. The processed information from image processor 47 can be input to optical flow display 48 in which at each pixel level the optical flow vectors are displayed. For example, as shown, the optical flow vector at pixel 48a is the result of combining pixel data 41a of image 41, 42a of 42, 45a of image 45 and 46a of image 46 as hereinafter described. Similarly, it can be seen that the optical flow vector at pixel 48b is the result of the processed image pixel data at its associated pixels of the images taken at times $t_0$ and time $t_1$ in spectral region 1 and spectral region n respectively.

Figure 5:
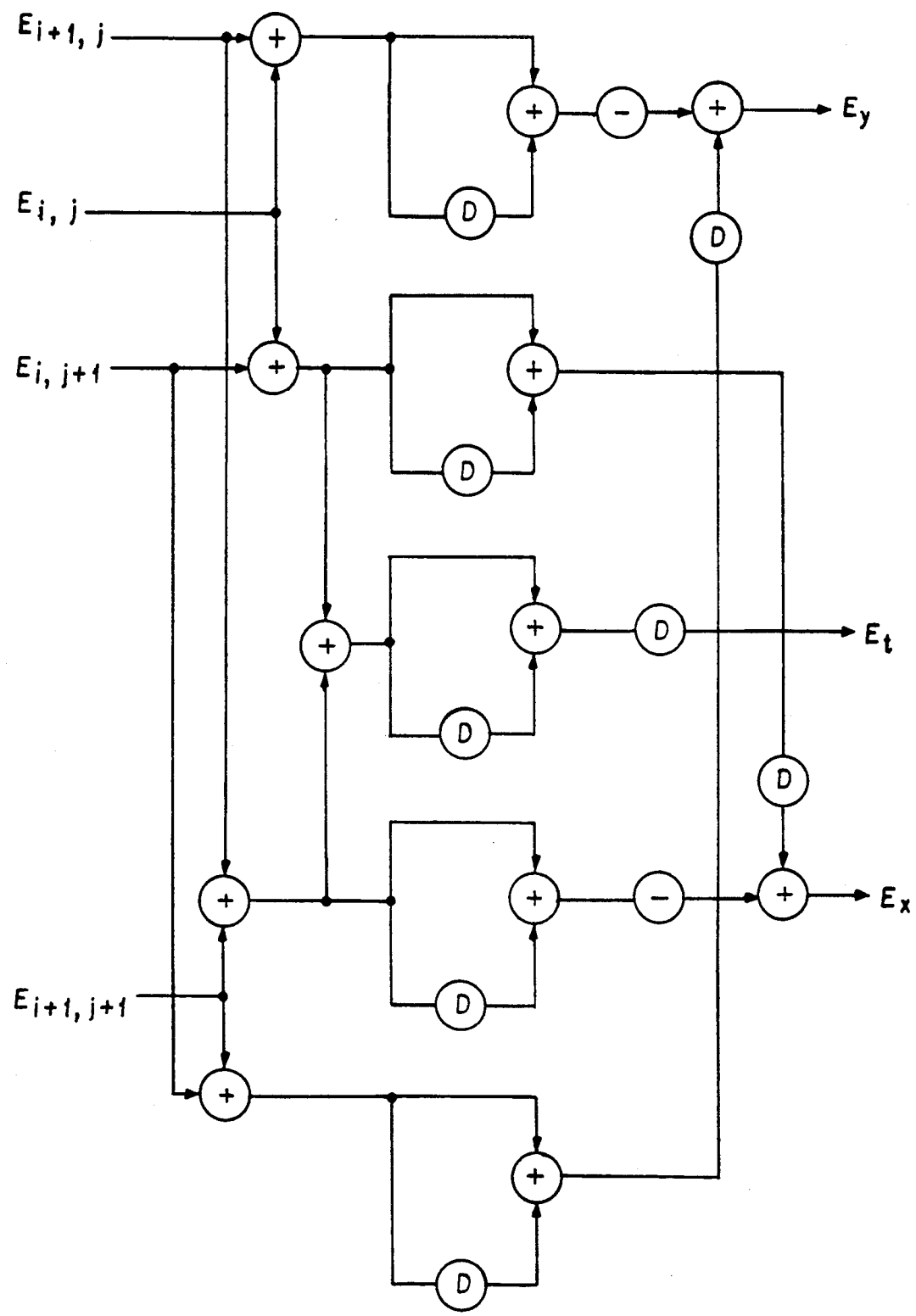
FIG. 5 is a logic circuit diagram showing an example of a combinational logic unit similar to the unit used in the processing method of FIGS. 2-4 to obtain partial derivatives of the brightness constancy equation.
Figure 6:
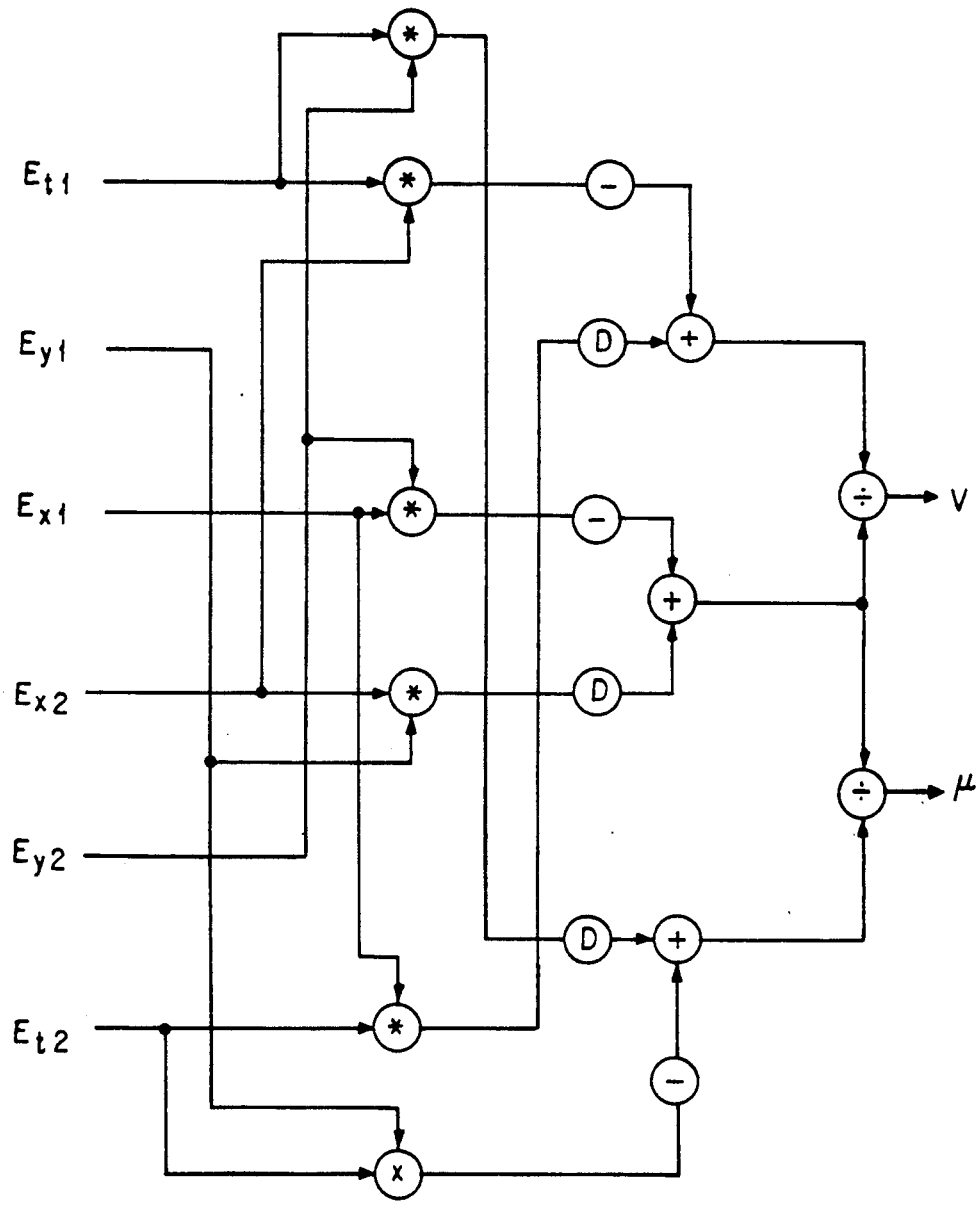
FIG. 6 is a logic circuit diagram showing additional combinational logic coupled to the logic of FIGS. 5 to produce optical flow vectors.

Referring now to FIG. 5 there is shown a logic circuit diagram which can be used to obtain the partial derivitives of the intensities E with respect to x, y and t for the $2 \times 2$ pixel array of FIG. 2. The intensity E of the $2 \times 2$ pixel array of FIG. 2 can be defined as having coordinates identified by the intensity subscripts. The inputs shown in FIG. 5 correspond to those pixel inputs. By providing appropriate combinational logic with selective use of delays D as shown in FIG. 5 the partial derivitives $E_y$, $E_t$ and $E_x$ can easily be derived. The delays D are utilized to wait until the processing of data taken at time $t_1$ advances to the appropriate processing stage to be combined with data taken at time $t_o$. The processor 17 has the same combinational logic of FIG. 5 for each spectral region being utilized.

Assuming that two spectral regions are being used in a particular application the partial derivitive outputs shown in FIG. 5 will be derived for each of the two spectral regions. These are shown as the inputs to combinational logic circuitry shown in FIG. 6. By combining these inputs as shown optical flow vectors u and v can be obtained as electronic outputs as shown.

The present invention can also be implemented in software as the processing 17 step using a general purpose computer. The present invention was implemented on such a general purpose computer, the TI Explorer, a trademark of Texas Instruments Incorporated, manufactured by Texas Instruments Incorporated utilizing the LISP code attached hereto as Appendix I. The image data sets of two spectral regions were used as input to the program which includes both preprocessing 16 and postprocessing 19 procedures.

Regardless of the processing used particular applications may require postprocessing 19 as shown in FIG. 1. If this is the case, the decision 18 is made whether or not such postprocessing of the output of the processor 17 is needed prior to displaying 20, or otherwise utilizing, the optical flow can be included in the method 10. As previously described with regard to preprocessing 16 well known smoothing techniques can be utilized for postprocessing 19, however it is preferred that if postprocessing 19 is required that median-filtering be utilized. It has been found that median filtering improves the flowfields with substantially fewer iterations as opposed to the many iterations required by known smoothing techniques.

It will be appreciated by those skilled in the art that changes and variations in the embodiments described herein can be made without departing from the spirit and scope of the present invention as defined by the following claims.

*LISP CODE                    Appendix I*

```
;
; Array and global variable declarations
;
;--------------------------------------------------------

(defparameter img-x 220) ;220 for CW, 241 for ODYSSEY
(defparameter img-y 310) ;310 for CW, 384 for ODYSSEY
(defparameter img-x-1 219)
(defparameter img-y-1 309)
(defconst EX (make-array (list img-x-1 img-y-1) :element-type '(single-float) :initial-value 0.0))
(defconst EY (make-array (list img-x-1 img-y-1) :element-type '(single-float) :initial-value 0.0))
(defconst ET (make-array (list img-x-1 img-y-1) :element-type '(single-float) :initial-value 0.0))
(defconst EX1 (make-array (list img-x-1 img-y-1) :element-type '(single-float) :initial-value 0.0))
(defconst EY1 (make-array (list img-x-1 img-y-1) :element-type '(single-float) :initial-value 0.0))
(defconst ET1 (make-array (list img-x-1 img-y-1) :element-type '(single-float) :initial-value 0.0))
(defconst U-ARR (make-array (list img-x-1 img-y-1) :element-type '(single-float) :initial-value 0.0))
(defconst V-ARR (make-array (list img-x-1 img-y-1) :element-type '(single-float) :initial-value 0.0))
(defconst MED-U-ARR (make-array (list img-x-1 img-y-1) :element-type '(single-float) :initial-value 0.0))
(defconst MED-V-ARR (make-array (list img-x-1 img-y-1) :element-type '(single-float) :initial-value 0.0))
(defconst SMALL-U-ARR (make-array (list 9) :element-type '(single-float) :initial-value 0.0))
(defconst SMALL-V-ARR (make-array (list 9) :element-type '(single-float) :initial-value 0.0))
(defconst T-U-ARR (make-array (list img-y-1 img-x-1) :element-type '(single-float) :initial-value 0.0))
(defconst T-V-ARR (make-array (list img-y-1 img-x-1) :element-type '(single-float) :initial-value 0.0))
(defconst U-TEMP (make-array (list img-x-1 img-y-1) :element-type '(single-float) :initial-value 0.0))
(defconst V-TEMP (make-array (list img-x-1 img-y-1) :element-type '(single-float) :initial-value 0.0))
(defconst U-NEW-TEMP (make-array (list img-x-1 img-y-1) :element-type '(single-float) :initial-value 0.0))
(defconst V-NEW-TEMP (make-array (list img-x-1 img-y-1) :element-type '(single-float) :initial-value 0.0))
(defconst A1 (make-array (list img-x img-y) :element-type '(single-float) :initial-value 0.0))
(defconst A2 (make-array (list img-x img-y) :element-type '(single-float) :initial-value 0.0))
(defconst A3 (make-array (list img-x img-y) :element-type '(single-float) :initial-value 0.0))
(defconst A4 (make-array (list img-x img-y) :element-type '(single-float) :initial-value 0.0))
(defconst NU-A1 (make-array (list img-x img-y) :element-type '(single-float) :initial-value 0.0))
(defconst NU-A2 (make-array (list img-x img-y) :element-type '(single-float) :initial-value 0.0))
(defconst NU-A3 (make-array (list img-x img-y) :element-type '(single-float) :initial-value 0.0))
(defconst NU-A4 (make-array (list img-x img-y) :element-type '(single-float) :initial-value 0.0))

(defvar k 16)
(defvar itr 16)
(defvar pitr 5)
(defvar my-window nil)
(defvar mitr 1)
(defvar determ 1.0)

;--------------------------------------------------------
;
; Main body of multi-spectral optical flow code
;
;--------------------------------------------------------

(defun INT-MENU ()
  (tv:choose-variable-values
    '((pitr "Number of pre-smoothing iterations" :number)
      (itr "Number of post-smoothing iterations" :number)
      (k "Relative weight of accuracy to smoothness" :number)
      (mitr "Number of median-filter iterations" :number))
    ':label "Initialization Parameters"))

;*****************************************************************
;
; To execute the multi-spectral optical flow code, the following floating-point
; arrays must be initialized as shown:
;
;           a1 <-- time 1, spectral region 1
;           a2 <-- time 2, spectral region 1
;           a3 <-- time 1, spectral region 2
;           a4 <-- time 2, spectral region 2
;
; These arrays constitute the input data for the code. The final output is contained
; in the arrays "u-arr" and "v-arr". These arrays represent the two components of the
; optical flow vectors.
;
;*****************************************************************
```

```lisp
(defun DERIVATIVES ()
   (loop for x from 0 to (- img-x-1 1) do
        (loop for y from 0 to (- img-y-1 1) do
              (setf (aref ex x y) (/ (- (+ (aref a1 (+ x 1) y) (aref a2 (+ x 1) y)
                                           (aref a1 (+ x 1) (+ y 1)) (aref a2 (+ x 1) (+ y 1)))
                                        (+ (aref a1 x y) (aref a2 x y) (aref a1 x (+ y 1))
                                           (aref a2 x (+ y 1)))) 4))

(setf (aref ey x y) (/ (- (+ (aref a1 x (+ y 1)) (aref a2 x (+ y 1))
                                           (aref a1 (+ x 1) (+ y 1)) (aref a2 (+ x 1) (+ y 1)))
                                        (+ (aref a1 x y) (aref a2 x y) (aref a1 (+ x 1) y)
                                           (aref a2 (+ x 1) y))) 4))

(setf (aref et x y) (/ (- (+ (aref a2 x y) (aref a2 x (+ y 1)) (aref a2 (+ x 1) y)
                                           (aref a2 (+ x 1) (+ y 1)))
                                        (+ (aref a1 x y) (aref a1 x (+ y 1)) (aref a1 (+ x 1) y)
                                           (aref a1 (+ x 1) (+ y 1)))) 4))
              (setf (aref ex1 x y) (/ (- (+ (aref a3 (+ x 1) y) (aref a4 (+ x 1) y)
                                            (aref a3 (+ x 1) (+ y 1)) (aref a4 (+ x 1) (+ y 1)))
                                         (+ (aref a3 x y) (aref a4 x y) (aref a3 x (+ y 1))
                                            (aref a4 x (+ y 1)))) 4))

(setf (aref ey1 x y) (/ (- (+ (aref a3 x (+ y 1)) (aref a4 x (+ y 1))
                                            (aref a3 (+ x 1) (+ y 1)) (aref a4 (+ x 1) (+ y 1)))
                                         (+ (aref a3 x y) (aref a4 x y) (aref a3 (+ x 1) y)
                                            (aref a4 (+ x 1) y))) 4))

(setf (aref et1 x y) (/ (- (+ (aref a4 x y) (aref a4 x (+ y 1)) (aref a4 (+ x 1) y)
                                            (aref a4 (+ x 1) (+ y 1)))
                                         (+ (aref a3 x y) (aref a3 x (+ y 1)) (aref a3 (+ x 1) y)
                                            (aref a3 (+ x 1) (+ y 1)))) 4))
              )
         )
    )

(defun VELOCITY-VECS ()
   (loop for x from 0 to (- img-x-1 1) do
        (loop for y from 0 to (- img-y-1 1) do
              (setf determ (- (* (aref ex1 x y) (aref ey x y)) (* (aref ex x y) (aref ey1 x y))))
              (when (< (abs determ) 0.00001) (setf determ 0.0))
              (when (not (= determ 0.0))
                 (setf (aref u-arr x y) (/ (- (* (aref ey x y) (aref et1 x y)) (* (aref ey1 x y) (aref et x y)))
                                           (* -1 determ)))

(setf (aref v-arr x y) (/ (- (* (aref ex x y) (aref et1 x y)) (* (aref ex1 x y) (aref et x y)))
                                           determ))
                 (setf mcount (+ mcount 1)))
              )
         ).
    )

;----------------------------------------------------------------------------
;
; Pre and post-processing routines
;
;----------------------------------------------------------------------------

(defun PRE-SMOOTHING ()
   (loop for x from 1 to img-x-1 do
        (loop for y from 1 to img-y-1 do
              (setf (aref nu-a1 x y) (/ (float (+ (aref a1 (- x 1) (+ y 1))
                                                  (aref a1 x (+ y 1)) (aref a1 (+ x 1) (+ y 1))
                                                  (aref a1 (- x 1) y) (aref a1 x y) (aref a1 (+ x 1) y)
                                                  (aref a1 (- x 1) (- y 1)) (aref a1 x (- y 1))
                                                  (aref a1 (+ x 1) (- y 1)))) 9))
              (setf (aref nu-a2 x y) (/ (float (+ (aref a2 (- x 1) (+ y 1))
                                                  (aref a2 x (+ y 1)) (aref a2 (+ x 1) (+ y 1))
                                                  (aref a2 (- x 1) y) (aref a2 x y) (aref a2 (+ x 1) y)
                                                  (aref a2 (- x 1) (- y 1)) (aref a2 x (- y 1))
                                                  (aref a2 (+ x 1) (- y 1)))) 9))
              )
         )
   (loop for x from 1 to img-x-1 do
        (loop for y from 1 to img-y-1 do
              (setf (aref a1 x y) (aref nu-a1 x y))
              (setf (aref a2 x y) (aref nu-a2 x y))
              )
         )

(loop for x from 1 to img-x-1 do
        (loop for y from 1 to img-y-1 do
              (setf (aref nu-a3 x y) (/ (float (+ (aref a3 (- x 1) (+ y 1))
                                                  (aref a3 x (+ y 1)) (aref a3 (+ x 1) (+ y 1))
                                                  (aref a3 (- x 1) y) (aref a3 x y) (aref a3 (+ x 1) y)
                                                  (aref a3 (- x 1) (- y 1)) (aref a3 x (- y 1))
                                                  (aref a3 (+ x 1) (- y 1)))) 9))
              (setf (aref nu-a4 x y) (/ (float (+ (aref a4 (- x 1) (+ y 1))
                                                  (aref a4 x (+ y 1)) (aref a4 (+ x 1) (+ y 1))
                                                  (aref a4 (- x 1) y) (aref a4 x y) (aref a4 (+ x 1) y)
                                                  (aref a4 (- x 1) (- y 1)) (aref a4 x (- y 1))
                                                  (aref a4 (+ x 1) (- y 1)))) 9))
              )
         )
   (loop for x from 1 to img-x-1 do
        (loop for y from 1 to img-y-1 do
              (setf (aref a3 x y) (aref nu-a3 x y))
              (setf (aref a4 x y) (aref nu-a4 x y))
              )
         )
    )
```

```
(defun POST-SMOOTHING ()
  (loop for x from 1 to (- img-x-1 2) do
        (loop for y from 1 to (- img-y-1 2) do
              (setf (aref u-new-temp x y) (+ (+ (aref u-arr (- x 1) (- y 1))
                                                (aref u-arr (+ x 1) (- y 1))
                                                (aref u-arr (- x 1) (+ y 1))
                                                (aref u-arr (+ x 1) (+ y 1)))
                                             (* 4 (+ (aref u-arr x (- y 1))
                                                     (aref u-arr (- x 1) y)
                                                     (aref u-arr (+ x 1) y)
                                                     (aref u-arr x (+ y 1))))
                                         )
              )
              (setf (aref v-new-temp x y) (+ (+ (aref v-arr (- x 1) (- y 1))
                                                (aref v-arr (+ x 1) (- y 1))
                                                (aref v-arr (- x 1) (+ y 1))
                                                (aref v-arr (+ x 1) (+ y 1)))
                                             (* 4 (+ (aref v-arr x (- y 1))
                                                     (aref v-arr (- x 1) y)
                                                     (aref v-arr (+ x 1) y)
                                                     (aref v-arr x (+ y 1))))
                                         )
              )
        )
  )

(loop for x from 1 to (- img-x-1 2) do
        (loop for y from 1 to (- img-y-1 2) do
              (setf (aref u-temp x y) (/ (+ (aref u-arr x y) (* (aref u-new-temp x y) (* k k)))
                                         (+ 1 (* 20 (* k k)))))
              (setf (aref u-arr x y) (aref u-temp x y))
              (setf (aref v-temp x y) (/ (+ (aref v-arr x y) (* (aref v-new-temp x y) (* k k)))
                                         (+ 1 (* 20 (* k k)))))
              (setf (aref v-arr x y) (aref v-temp x y))
              )
        )
  )
)

(defun MEDIAN-FILTER ()
  (loop for x from 1 to (- img-x-1 2) do
        (loop for y from 1 to (- img-y-1 2) do
              (setf (aref small-u-arr 0) (aref u-arr (- x 1) (- y 1)))
              (setf (aref small-u-arr 1) (aref u-arr (- x 1) y))
              (setf (aref small-u-arr 2) (aref u-arr (- x 1) (+ y 1)))
              (setf (aref small-u-arr 3) (aref u-arr x (- y 1)))
              (setf (aref small-u-arr 4) (aref u-arr x y))
              (setf (aref small-u-arr 5) (aref u-arr x (+ y 1)))
              (setf (aref small-u-arr 6) (aref u-arr (+ x 1) (- y 1)))
              (setf (aref small-u-arr 7) (aref u-arr (+ x 1) y))
              (setf (aref small-u-arr 8) (aref u-arr (+ x 1) (+ y 1)))
              (sort small-u-arr #'>)
              (setf (aref med-u-arr x y) (aref small-u-arr 4))

(setf (aref small-v-arr 0) (aref v-arr (- x 1) (- y 1)))
              (setf (aref small-v-arr 1) (aref v-arr (- x 1) y))
              (setf (aref small-v-arr 2) (aref v-arr (- x 1) (+ y 1)))
              (setf (aref small-v-arr 3) (aref v-arr x (- y 1)))
              (setf (aref small-v-arr 4) (aref v-arr x y))
              (setf (aref small-v-arr 5) (aref v-arr x (+ y 1)))
              (setf (aref small-v-arr 6) (aref v-arr (+ x 1) (- y 1)))
              (setf (aref small-v-arr 7) (aref v-arr (+ x 1) y))
              (setf (aref small-v-arr 8) (aref v-arr (+ x 1) (+ y 1)))
              (sort small-v-arr #'>)
              (setf (aref med-v-arr x y) (aref small-v-arr 4))
              )
        )
  )

(loop for x from 1 to (- img-x-1 2) do
        (loop for y from 1 to (- img-y-1 2) do
              (setf (aref u-arr x y) (aref med-u-arr x y))
              (setf (aref v-arr x y) (aref med-v-arr x y))
              )
        )
  )
)

;---------------------------------------------------------------------
;
; Flow-field display routines
;
;---------------------------------------------------------------------

(defun TRANS ()
  (loop for x from 0 to (- img-x-1 1) do
        (loop for y from 0 to (- img-y-1 1) do
              (setf (aref t-u-arr y x) (aref u-arr x y))
              (setf (aref t-v-arr y x) (aref v-arr x y))
              )
        )
  )
)

(defvar plot-x-start 50)
(defvar plot-x-stop 100)
(defvar plot-y-start 50)
(defvar plot-y-stop 100)
(defvar magn 3)
(defvar scl 0.1)
```

```
(defun RE-PLOT ()
  (tv:choose-variable-values
     '((plot-x-start "Begin plot x-pixel" :number)
       (plot-y-start "Begin plot y-pixel" :number)
       (plot-x-stop "Stop plot x-pixel" :number)
       (plot-y-stop "Stop plot y-pixel" :number)
       (magn "Plot Magnification" :number)
       (scl "Plot Scale" :number))
     ':label "Plot Parameters")
  (setq ppv (make-instance 'display-vecs
                          :x-start plot-x-start
                          :x-stop plot-x-stop
                          :y-start plot-y-start
                          :y-stop plot-y-stop
                          :magnification magn
                          :scale scl))
  (send ppv :display)
)

(defflavor DISPLAY-VECS
          ((X-start 50)
           (X-stop 100)
           (Y-start 50)
           (Y-stop 100)
           (Magnification 3)
           (Scale 0.1))
          ()

:settable-instance-variables)

(defmethod (display-vecs :DISPLAY) ()
  (declare (special my-window))
  (unless my-window
     (setq my-window (tv:make-window 'tv:window)))
  (if (not (send my-window ':exposed-p))
      (send my-window ':expose))
  (loop for x from X-start to X-stop do
        (loop for y from Y-start to Y-stop do
              (send my-window ':draw-filled-in-circle (* Magnification (- x X-start))
                    (* Magnification (- y Y-start)) 1 w:blue)
              (send my-window ':draw-line (* Magnification (- x X-start))
                    (* Magnification (- y Y-start)) (round (- (* Magnification (- x X-start))
                                                              (* Scale (aref t-v-arr x y))))
                    (round (- (* Magnification (- y Y-start)) (* Scale (aref t-u-arr x y)))))
        )
    )
 )

;------------------------------------------------------------
;
; Driver routine for multi-spectral optical flow computation
;
;------------------------------------------------------------

(defun MULTI-SPECTRAL ()
  (int-menu)
  (dotimes (i pitr)
     (pre-smoothing))
  (derivatives)
  (velocity-vecs)
  (dotimes (i mitr)
     (median-filter))
  (dotimes (i itr)
     (post-smoothing))
  (trans)
  (re-plot)
)
```

What is claimed is:

1. A method of determining optical flow comprising the steps of:
   obtaining a first image from a first spectral region of a field of view at a first time by a first image sensor;
   obtaining a second image from a second spectral region of the field of view at said first time by a second image sensor; and
   processing said first and second images to obtain the optical flow of the field of view by a processor.

2. The method of determining optical flow as defined in claim 1, wherein said processing step comprises the step of producing first order partial derivatives of intensities at one or more points within the first and second images for said first and second spectral regions.

3. the method of determining optical flow as defined in claim 2, wherein the first order partial derivatives have the following relationships:

$$E_{xs1}u + E_{ys1}v + E_{ts1} = 0$$

$$E_{xs2}u + E_{ys2}v + E_{ts2} = 0$$

, and wherein $E_{xs1}$, $E_{ys1}$ and $E_{ts1}$ are the first order partial derivatives of the intensities in said first spectral region with respect to image coordinates (x,y) and time (t) respectively, and wherein $E_{xs2}$, $E_{ys2}$ and $E_{ts2}$ are the first order partial derivatives of the intensities in said second spectral region with respect to the image coordinates (x,y) and the time (t) respectively and, and wherein (u, v) is an associated optical flow vector.

4. The method of determining optical flow as defined in claim 1, wherein said processing step comprises smoothing said first and second images.

5. The method of determining optical flow as defined in claim 1, wherein said processing step further comprises the step of smoothing said optical flow.

6. The method of determining optical flow as defined in claim 5, wherein said processing step comprises the step of median-filtering said optical flow.

7. The method of determining optical flow as defined in claim 1, wherein said method further comprises the step of substantially spatially registering said first and second images of said first and second spectral regions.

8. The method of determining optical flow as defined in claim 1, wherein said processing step comprises the step of substantially spatially registering said first and second images.

9. The method of determining optical flow as defined in claim 1, wherein said processing step comprises the step of producing second order partial derivatives of the intensities of the first and second images for said first and second spectral regions.

10. The method of determining optical flow as defined in claim 9, wherein the method comprises the step of providing the second order partial derivatives with the following relationships:

$$E_{xxs1}u + E_{xys1}v + E_{xts1} = 0$$

$$E_{xys1}u + E_{yys1}v + E_{yts1} = 0$$

$$E_{xxs2}u + E_{xys2}v + E_{xts2} = 0$$

$$E_{xys2}u + E_{yys2}v + E_{yts2} = 0$$

, and wherein $E_{xxa1}$, $E_{xys1}$ and $E_{yys1}$ are the second order partial derivatives of the intensities of said first spectral region with respect to image coordinates (x,y), and wherein $E_{xxs2}$, $E_{xys2}$ and $E_{yys2}$ are additional second order partial derivatives of additional intensities of said second spectral region with respect to said image coordinates (x,y), and wherein $E_{xts1}$ and $E_{yts1}$ are the second order partial derivatives of said intensities of said first spectral region, and wherein and $E_{xts2}$ and $E_{yts2}$ are further second order partial derivatives of further intensities of said second spectral region with respect to said image coordinates (x,y) and time (t), and wherein (u,v) is an associated optical flow vector.

11. The method of determining optical flow as defined in claim 9, wherein said processing step further comprises the step of smoothing said first and second images.

12. The method of determining optical flow as defined in claim 9, wherein said processing step further comprises the step of smoothing said optical flow.

13. The method of determining optical flow as defined in claim 12, wherein said processing step comprises the step of median-filtering said optical flow.

14. The method of determining optical flow as defined in claim 9, wherein said method further comprises the step of substantially spatially registering said first and second images of said first and second spectral regions.

15. The method of determining optical flow as defined in claim 9, wherein said processing step further comprises the step of substantially spatially registering said images.

16. A method of determining optical flow comprising the steps of:
- obtaining a first image from a first spectral region of a field of view at a first time by a first image sensor;
- obtaining a second image from a second spectral region of the field of view at said first time by a second image sensor; and
- processing said first and second images to obtain first and second order partial derivatives of intensities of said first and second images for said first and second spectral regions by a processor to thereby obtain the optical flow of said first and second images.

17. The method of determining optical flow as defined in claim 16, wherein said processing step comprises the step of smoothing said first and second images.

18. The method of determining optical flow as defined in claim 16, wherein said processing step comprises the step of smoothing said optical flow.

19. The method of determining optical flow as defined in claim 18, wherein said processing step further comprises the step of median-filtering said optical flow.

20. Apparatus for determining optical flow comprising:
- a first image sensor for obtaining a first image from a first spectral region of a field of view;
- a second image sensor for obtaining a second image from a second spectral region of the field of view, wherein said first image sensor and said second image sensor are operable to obtain said first and second images at the same instance of time; and
- a processor for processing said first and second images to obtain the optical flow of the field of view.

21. Apparatus for determining optical flow as defined in claim 20, wherein said processor comprises means for obtaining first order partial derivatives of intensities of the first and second images for said first and second spectral regions.

22. Apparatus for determining optical flow as defined in claim 20, wherein said processor comprises means for obtaining second order partial derivatives of intensities of the first and second images for said first and second spectral regions.

* * * * *